United States Patent
Kurami

[11] Patent Number: 5,163,002
[45] Date of Patent: Nov. 10, 1992

[54] METHOD AND APPARATUS FOR AUTOMATIC STEERING CONTROL OF AUTOMOBILE

[75] Inventor: Kunihiko Kurami, Kawasaki, Japan
[73] Assignee: Nissan Motor Co., Ltd., Yokohama, Japan
[21] Appl. No.: 700,707
[22] Filed: May 16, 1991
[30] Foreign Application Priority Data
  May 18, 1990 [JP] Japan ............... 2-126884
[51] Int. Cl.$^5$ .............................. G06F 15/50
[52] U.S. Cl. ........................ 364/424.02; 358/103; 180/169; 364/460
[58] Field of Search ........... 364/424.02, 460, 461, 364/424.05; 180/167, 168, 169; 358/103; 318/587

[56] References Cited
U.S. PATENT DOCUMENTS

| | | | |
|---|---|---|---|
| 4,630,109 | 12/1986 | Barton | 358/103 |
| 4,819,169 | 4/1989 | Saitoh et al. | 358/103 |
| 4,858,132 | 8/1989 | Holmquist | 358/103 |
| 4,862,047 | 8/1989 | Suzuki et al. | 358/103 |
| 4,931,937 | 6/1990 | Kakinami et al. | 180/169 |
| 4,970,653 | 11/1990 | Kenue | 364/424.02 |
| 5,081,585 | 1/1992 | Kurami et al. | 180/168 |

Primary Examiner—Gary Chin
Attorney, Agent, or Firm—Foley & Lardner

[57] ABSTRACT

A method and an apparatus for automatic steering control of an automobile, which can be carried out efficiently by using only one regression equation for calculating a steering angle. In the apparatus, a white line drawn on a road is detected by camera; a distance of the detected white line with respect to a view axis of the camera is determined; the determined distance is transformed into a corresponding distance of the white line with respect to a prescribed point on a central axis of the automobile; a steering angle is calculated according to the obtained corresponding distance; and a steering of the automobile is controlled according to the calculated steering angle such that the automobile follows the white line.

16 Claims, 4 Drawing Sheets

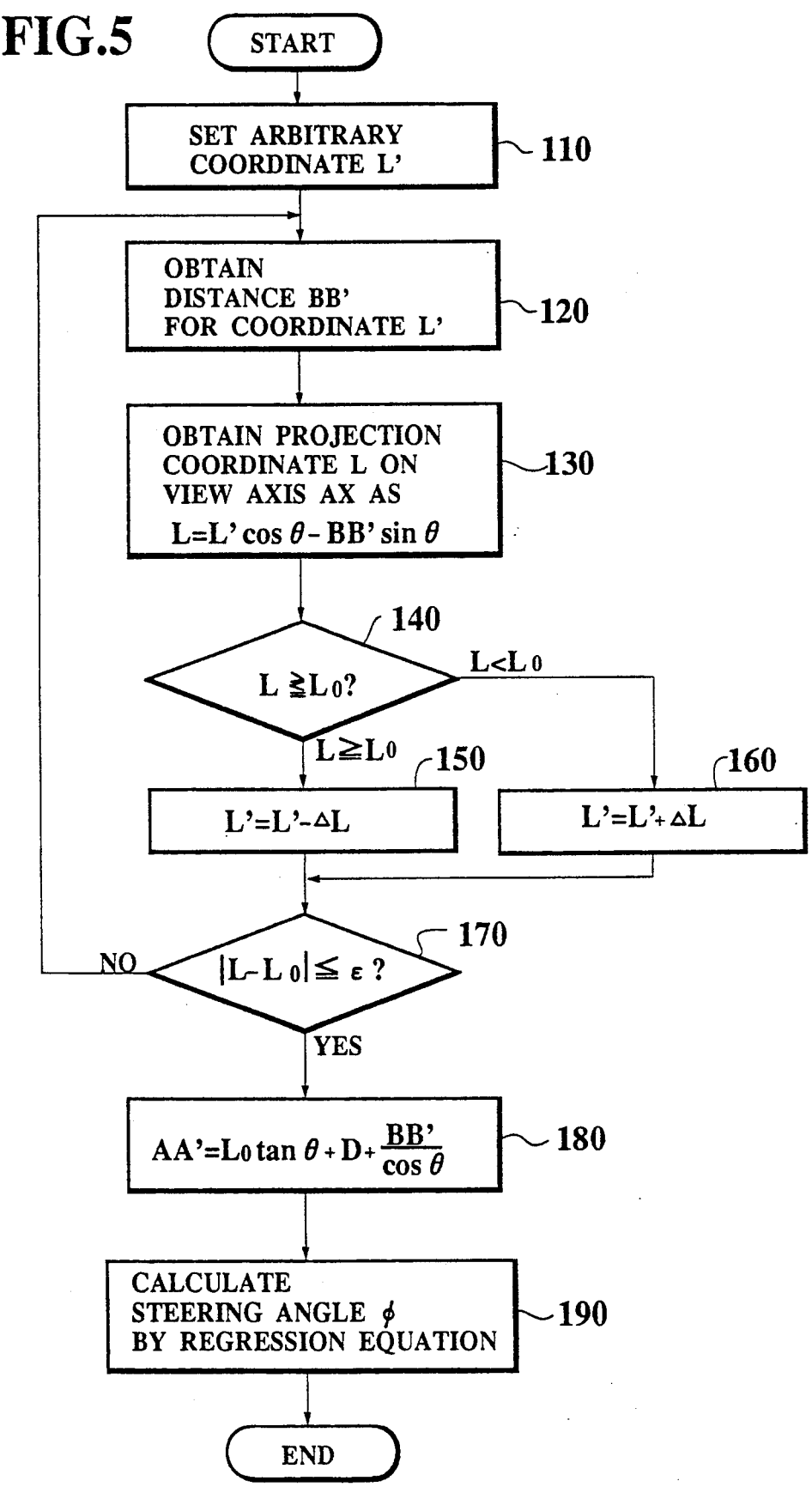

METHOD AND APPARATUS FOR AUTOMATIC STEERING CONTROL OF AUTOMOBILE

BACKGROUND OF THE INVENTION

1. Field of the Invention

The present invention relates to a method and an apparatus for automatic steering control of an automobile capable of driving under an automatic steering mode.

2. Description of the Background Art

An automatic steering control of an automobile has been achieved conventionally by detecting a white line drawn on a road and controlling the steering of the automobile automatically such that the automobile follows this white line, in a manner shown in FIG. 1.

Namely, in this conventional method of automatic steering control shown in FIG. 1, a distance AA' from a point A located on a view axis AX of a camera CA provided on an automobile 100 with an orientation along a direction of a car central axis to a point A' located on a white line SW drawn on a road at which a line SA perpendicular to the view axis AX at the point A intersects with the white line SW is calculated, and a steering angle is calculated according to the calculated distance AA'. Here, the steering angle $\phi$ is calculated by using a so called regression equation for determining a steering angle $\phi$ from three distances AA' $(i-2)$, AA' $(i-1)$, and AA' $(i)$ which are successively sampled at successive sampling timings $i-2$, $i-1$, and $i$, according to the following equation (1).

$$\phi = a_i AA'(i) + a_{i-1} AA'(i-1) + a_{i-2} AA'(i-2) + a_\phi \qquad (1)$$

where, $a_i$, $a_{i-1}$, $a_{i-2}$, and $a_\phi$ are constants. Now, in order to widen the scope of the camera view, the camera CA can be switched to another camera CB provided on the automobile 100 with an orientation along a direction inclined by an angle $\theta$ from the car central axis toward a front side of the automobile 100. In such a case, a distance BB' from a point B located on a view axis BX of the camera CB to a point B' located on the white line SW drawn on a road at which a line SB perpendicular to the view axis BX at the point B intersects with the white line SW is calculated, and a steering angle is calculated according to the calculated distance BB' by using the regression equation for the camera CB which has a form similar to that of the above equation (1) for the camera CA.

In this type of a conventional automatic steering control method using a plurality of cameras oriented in different directions which are sequentially switched in order to obtain a wider scope of the camera view, it has been necessary to provide as many numbers of regression equations as a number of the cameras involved, which made this type of method clumsy.

Also, there has been a problem that when a plurality of cameras were replaced by a single camera capable of changing its own orientation by being rotated, it becomes necessary to provide infinitely many regression equations, which is impractical.

SUMMARY OF THE INVENTION

It is therefore an object of the present invention to provide a method and an apparatus for automatic steering control of an automobile, which can be carried out efficiently by using only one regression equation for calculating a steering angle.

According to one aspect of the present invention there is provided a method of automatic steering control of an automobile, comprising the steps of: detecting a white line drawn on a road by camera means; determining a distance of the white line detected at the detecting step with respect to a view axis of the camera means; transforming the distance determined at the determining step into a corresponding distance of the white line with respect to a prescribed point on a central axis of the automobile; calculating a steering angle according to the corresponding distance obtained at the transforming step; and controlling a steering of the automobile according to the steering angle calculated at the calculating step such that the automobile follows the white line.

According to another aspect of the present invention there is provided an apparatus for automatic steering control of an automobile, comprising: at least one camera means for detecting a white line drawn on a road; means for determining a distance of the white line detected by the camera means with respect to a view axis of the camera means; means for transforming the distance determined by the determining means into a corresponding distance of the white line with respect to a prescribed point on a central axis of the automobile; means for calculating a steering angle according to the corresponding distance obtained by the transforming means; and means for controlling a steering of the automobile according to the steering angle calculated by the calculating means such that the automobile follows the white line.

Other features and avantages of the present invention will become apparent from the following description taken in conjunction with the accompanying drawings.

BRIEF DESCRIPTION OF THE DRAWINGS

FIG. 5 is a flow chart for a method of automatic steering control for an automobile carried out by the automatic steering control apparatus of FIG. 2.

DETAILED DESCRIPTION OF THE PREFERRED EMBODIMENTS

Figure 1:
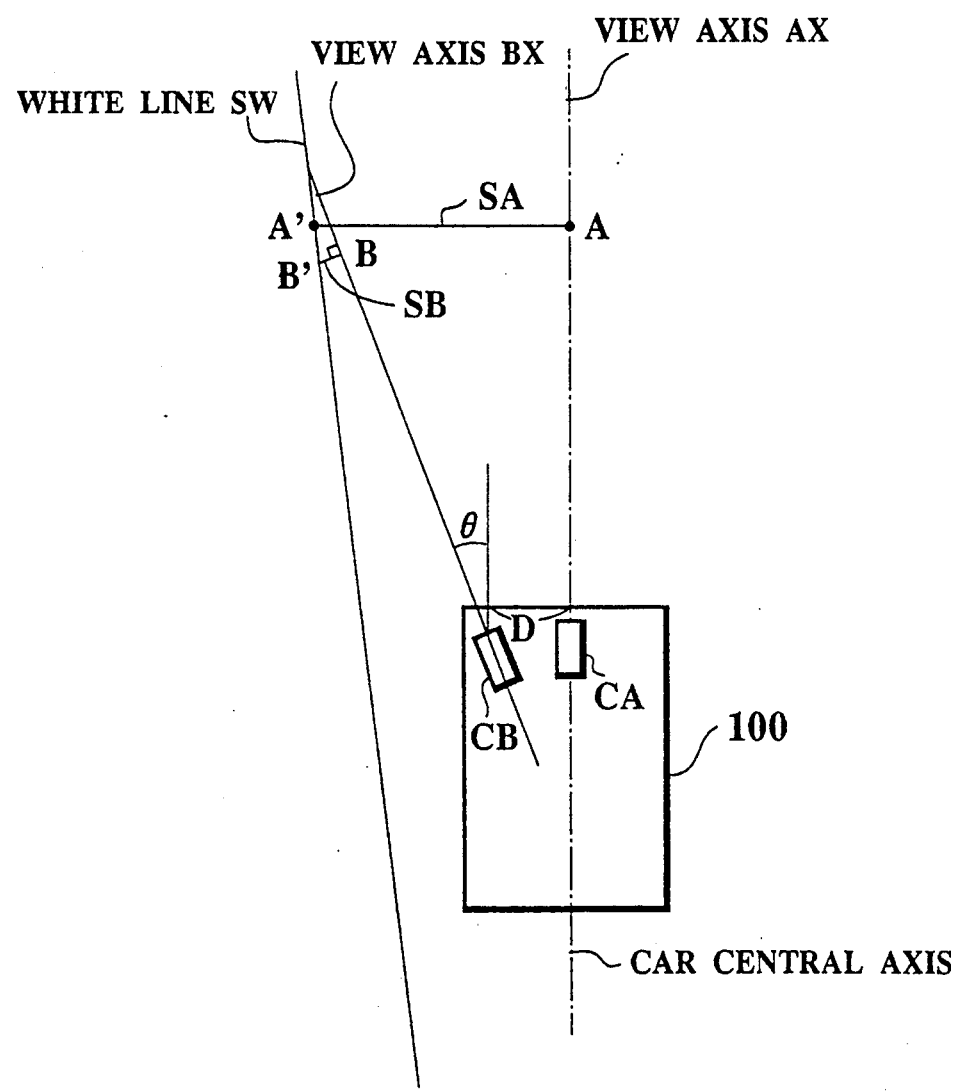
FIG. 1 is a diagram for explaining a conventional method of automatic steering control for an automobile.
Figure 2:
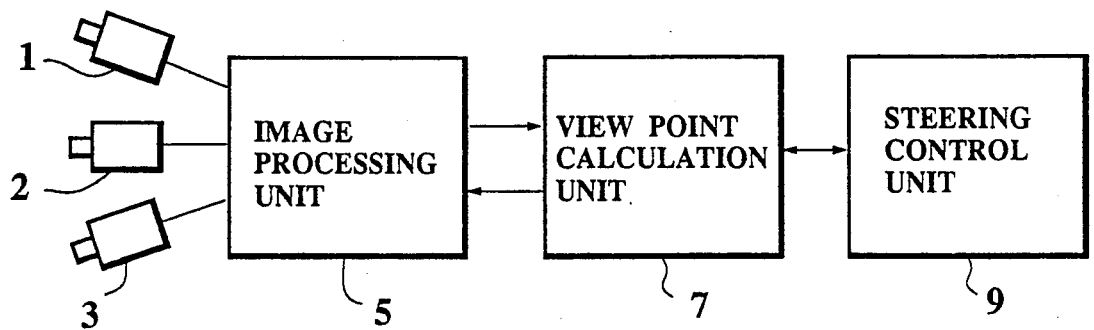
FIG. 2 is a schematic block diagram of one embodiment of an automatic steering control apparatus according to the present invention.

Referring now to FIG. 2, one embodiment of an automatic steering control apparatus according to the present invention will be described in detail.

This automatic steering control apparatus comprises: a plurality (three in FIG. 2) of cameras 1, 2, and 3 oriented along mutually different directions looking ahead of an automobile, where the camera 2 is oriented along a car central axis while the camera 1 is oriented along a direction inclined towards right side from the car central axis and the camera 3 is oriented along a direction inclined towards left side from the car central axis and; an image processing unit 5 for receiving image signals from cameras 1, 2, and 3 and calculating a distance to a white line on a road according to the received image signals from each of the cameras 1, 2, and 3; a view point calculation unit 7 for transforming the distances calculated by the image processing unit 5 according to the image signals from the cameras 1 and 3 into transformed distances with respect to coordinates associated with a view axis of the camera 2; and a steering control unit 9 for calculating the steering of the automobile by using the transformed distances obtained by the view point calculation unit 7 and controlling the steering of the automobile according to the obtained steering angle.

A situation in which this automatic steering control apparatus operates will now be described wtih references to FIGS. 3 and 4.

Figure 3:
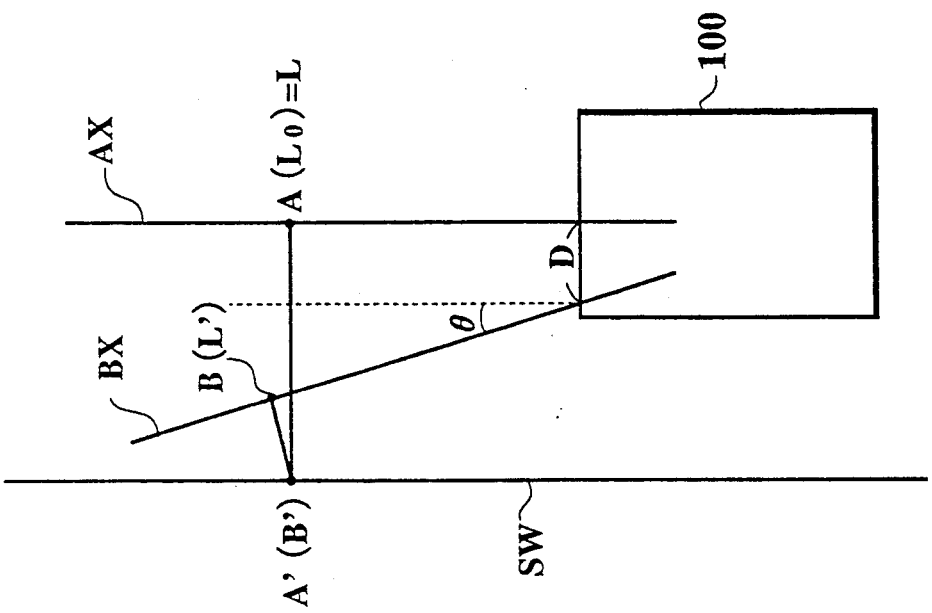
FIG. 3 is a diagram for explaining a method of automatic steering control for an automobile carried out by the automatic steering control apparatus of FIG. 2.

In FIG. 3, a prescribed point A on a view axis AX of the camera 2 located along a central axis of an automobile 100 has a coordinate $L_\phi$ and an arbitrary point B on a view axis BX of the camera 3 has a coordinate $L'$. The view axis BX of the camera 3 has an angle of inclination equal to $\theta$ with respect to the view axis of the camera 2, and the cameras 2 and 3 are separated by a distance D at the automobile 100.

A line perpendicular to the view axis BX of the camera 3 at the point B intersects with the white line SW on a road at a point B', while a line perpendicular to the view axis AX of the camera 2 at the point A intersects with the white line SW on a road at a point A', and the point B' is projected onto the view axis AX of the camera 2 in a direction perpendicular to the view axis AX at a projection coordinate L.

Then, there is a geometrical relationship given by the following equation (2).

$$L = L' \cos \theta - BB' \sin \theta \qquad (2)$$

Figure 4:
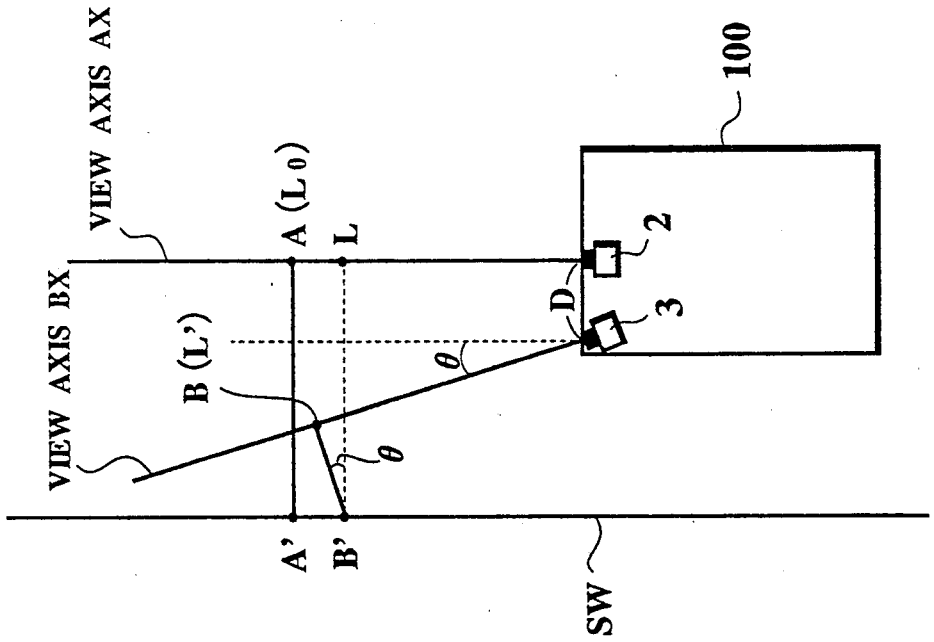
FIG. 4 is another diagram for explaining a method of automatic steering control for an automobile carried out by the automatic steering control apparatus of FIG. 2.

Now, when the point B on the view axis BX of the camera 3 is gradually displaced along the view axis BX until the projection coordinate L coincide with the coordinate $L_\phi$ of the point A as shown in FIG. 4, a distance BB' observed from the camera 3 corresponds to a distance AA' observed from the view point A of the camera 2. In this case, this distance AA' can be given by the following equation (3).

$$AA' = L_\phi \tan \theta + D + BB'/\cos \theta \qquad (3)$$

This distance AA', which is obtained by observing the distance BB' from the camera 3 in such a situation in which the above equation (3) holds, and by transforming the observed distance BB' into the corresponding distance AA' according to the above equation (3), can be utilized in calculating a steering angle $\phi$ by using the regression equation (1) described above for a conventional automatic steering control apparatus, which is appropriate for the camera 2.

In this automatic steering control apparatus, in order to achieve the above described situation in which the above equation (3) holds, the point B on the view axis BX of the camera 3 is gradually displaced along the view axis BX in a manner expressed in a term of the coordinate $L'$ of the point B by:

(i) $L' = L' - \Delta L$ when $L \geq L_{100}$, and
(ii) $L' = L' + \Delta L$ when $L < L_\phi$ where $\Delta L$ is a small displacement.

Now, the operation of this automatic steering control apparatus will be described with reference to the flow chart of FIG. 5.

First, at the step 110, the arbitrary point B on the view axis BX of the camera 3 with the coordinate $L'$ is set up.

Then, at the step 120, the distance BB' between the point B and the point B' at which a line perpendicular to the view axis BX at the point B intersects with the white line SW on a road is obtained by the image processing unit 5.

Next, at the step 130, the projection coordinate L of the point B' onto the view axis AX of the camera 2 in a direction perpendicular to the view axis AX is calculated from the obtained distance BB' according to the equation (2) described above.

Then, at the step 140, the calculated projection coordinate L is compared with the coordinate $L_\phi$ of the point A. When $L \geq L_\phi$, the coordinate $L'$ of the point B is reduced according to $L' = L' - \Delta L$ at the step 150, whereas when $L < L_\phi$, the coordinate $L'$ of the point B is increased according to $L' = L' + \Delta L$ at the step 160.

Next, whether L and $L_\phi$ coincide within a prescribed error $\epsilon$, i.e., if $|L - L_\phi| \leq \epsilon$ or not, is checked at the step 170. If L and $L_\phi$ do not coincide within a prescribed error $\epsilon$, the process returns to the step 120 above to repeat the adjustment of the coordinate $L'$ of the point B. On the other hand, if L and $L_\phi$ coincide within a prescribed error $\epsilon$, next at the step 180, the distance AA' corresponding to the distance BB' obtained at the step 120 is calculated by the view point calculation unit 7 according to the equation (3) described above.

Then, at the step 190, the steering angle $\phi$ is calculated by the steering control unit 9 by using the regression equation (1) described above, with the distance AA' calculated at the step 180 and two previous values for distances AA', such that the steering of the automobile 100 can be controlled by the steering control unit 9 according to the steering angle so obtained.

The camera 1 is also dealt with in a manner similar to that described above for the camera 3.

Thus, in this automatic steering control apparatus, the distances obtained by the cameras 1 and 3 which are oriented along directions different from a central axis of the automobile can be transformed into the corresponding distances with respect to the camera oriented along the central axis of the automobile, so that only one regression equation is needed for a plurality of cameras oriented in different directions.

Figure 6:
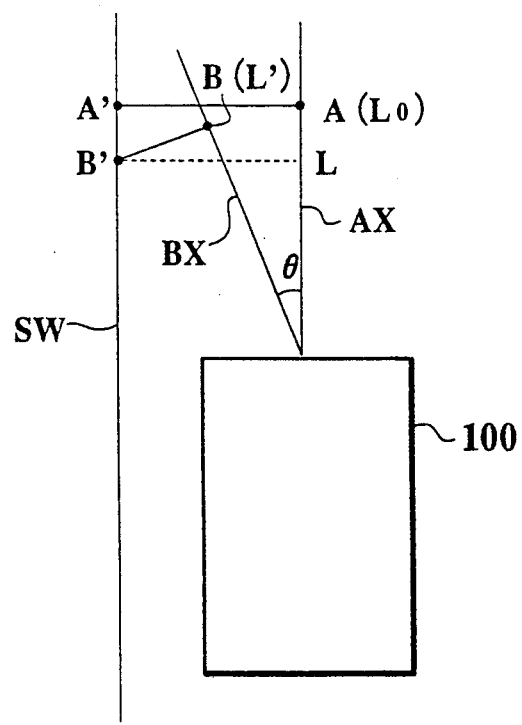
FIG. 6 is a diagram for explaining an alternative method of automatic steering control for an automobile carried out by the automatic steering control apparatus of FIG. 2.

It is to be noted that, a plurality of cameras oriented in different directions used in the above embodiment may be replaced by a single camera capable of changing its own orientation by being rotated. In this case, the situation corresponding to that of FIG. 3 in the above embodiment becomes as shown in FIG. 6, where the distance D separating the cameras in FIG. 3 is made equal to zero. Thus, in this case, the distance AA' can be calculated by the equation (3) described above, with $D = 0$.

Besides this, many modifications and variations of the above embodiment may be made without departing from the novel and advantageous features of the present invention. Accordingly, all such modifications and variations are intended to be included within the scope of the appended claims.

What is claimed is:

1. A method of automatic steering control of an automobile, comprising the steps of:
    detecting a white line drawn on a road by camera means;
    determining a distance of the white line detected at the detecting step with respect to a view axis of the camera means;
    transforming the distance determined at the determining step into a corresponding distance of the white line with respect to a prescribed point on a central axis of the automobile;
    calculating a steering angle according to the corresponding distance obtained at the transforming step; and
    controlling a steering of the automobile according to the steering angle calculated at the calculating step such that the automobile follows the white line.

2. The method of claim 1, wherein the camera means comprises a plurality of camera units oriented along mutually different directions, and wherein at the detecting step, the white line is detected by one of the camera units.

3. The method of claim 1, wherein the camera means comprises a single camera unit which can change its own orientation, and wherein at the detecting step, the white line is detected at a particular orientation of the single camera unit.

4. The method of claim 1, wherein at the calculating step, the steering angle is calculated by using a regression equation for calculating the steering angle from distances with respect to the prescribed point of the central axis of the automobile.

5. The method of claim 1, wherein at the determining step, the distance of the white line with respect to the view axis of the camera means is determined as a distance from a point on the view axis of the camera means to an intersection point of a line perpendicular to the view axis of the camera means at said point and the white line.

6. The method of claim 5, wherein the determining step includes a step of adjusting a coordinate of said point on the view axis of the camera means before determining the distance, such that a projection of the intersection point onto the central axis of the automobile in a direction perpendicular to the central axis of the automobile substantially coincides with the prescribed point on the central axis of the automobile.

7. The method of claim 6, wherein at the adjusting step, a coordinate of the projection of the intersection point is determined from a coordinate of said point on the view axis of the camera means and the distance of the white line with respect to the view axis of the camera means determined at the determining step.

8. The method of claim 6, wherein at the transforming step, the distance determined at the determining step is transformed according to a coordinate of the prescribed point on the central axis of the automobile and the distance of the white line with respect to the view axis of the camera means determined at the determining step.

9. An apparatus for automatic steering control of an automobile, comprising:
    at least one camera means for detecting a white line drawn on a road;
    means for determining a distance of the white line detected by the camera means with respect to a view axis of the camera means;
    means for transforming the distance determined by the determining means into a corresponding distance of the white line with respect to a prescribed point on a central axis of the automobile;
    means for calculating a steering angle according to the corresponding distance obtained by the transforming means; and
    means for controlling a steering of the automobile according to the steering angle calculated by the calculating means such that the automobile follows the white line.

10. The apparatus of claim 9, wherein the camera means comprises a plurality of camera units oriented along mutually different directions, and the white line is detected by one of the camera units.

11. The apparatus of claim 9, wherein the camera means comprises a single camera unit which can change its own orientation, and the white line is detected at a particular orientation of the single camera unit.

12. The apparatus of claim 9, wherein the calculating means calculates the steering angle by using a regression equation for calculating the steering angle from distances with respect to the prescribed point of the central axis of the automobile.

13. The apparatus of claim 9, wherein the determining means determines the distance of the white line with respect to the view axis of the camera means as a distance from a point on the view axis of the camera means to an intersection point of a line perpendicular to the view axis of the camera means at said point and the white line.

14. The apparatus of claim 13, wherein the determining means includes means for adjusting a coordinate of said point on the view axis of the camera means before determining the distance, such that a projection of the intersection point onto the central axis of the automobile in a direction perpendicular to the central axis of the automobile substantially coincides with the prescribed point on the central axis of the automobile.

15. The apparatus of claim 14, wherein the adjusting means determines a coordinate of the projection of the intersection point from a coordinate of said point on the view axis of the camera means and the distance of the white line with respect to the view axis of the camera means determined by the determining means.

16. The apparatus of claim 14, wherein the transforming means transforms the distance determined by the determining means according to a coordinate of the prescribed point on the central axis of the automobile and the distance of the white line with respect to the view axis of the camera means determined by the determining means.

* * * * *